(12) United States Patent
Czimmek

(10) Patent No.: US 7,412,972 B2
(45) Date of Patent: Aug. 19, 2008

(54) DISPERSION-TYPE SUPPRESSOR FOR ACOUSTIC NOISE REDUCTION OF A GASEOUS FUEL INJECTOR

(75) Inventor: Perry Robert Czimmek, Williamsburg, VA (US)

(73) Assignee: Continental Automotive Systems US, Inc., Auburn Hills ( * ) Notice: Subject to any disclaimer, the term of this patent is extended or adjusted under 35 U.S.C. 154(b) by 0 days.

(21) Appl. No.: 11/070,255

(22) Filed: Mar. 3, 2005

(65) Prior Publication Data
US 2005/0193984 A1 Sep. 8, 2005

Related U.S. Application Data

(60) Provisional application No. 60/550,152, filed on Mar. 4, 2004.

(51) Int. Cl.
*F02M 61/12* (2006.01)
(52) U.S. Cl. ......................... 123/527; 123/470
(58) Field of Classification Search ............... 123/470, 123/468, 469, 527
See application file for complete search history.

(56) References Cited

U.S. PATENT DOCUMENTS

| | | | |
|---|---|---|---|
| 5,343,847 A * | 9/1994 | Chasteen et al. | 123/527 |
| 5,383,647 A | 1/1995 | Jorach et al. | |
| 5,494,224 A | 2/1996 | Hall et al. | |
| 5,707,012 A | 1/1998 | Maier et al. | |
| 5,887,574 A * | 3/1999 | Smith | 123/527 |
| 6,196,204 B1 * | 3/2001 | Janach | 123/527 |
| 6,363,915 B1 | 4/2002 | Cohen | |
| 6,371,092 B1 * | 4/2002 | Guglielmo et al. | 123/527 |
| 6,508,418 B1 | 1/2003 | Fochtman et al. | |
| 6,609,499 B2 * | 8/2003 | Kabat et al. | 123/432 |
| 6,684,852 B2 * | 2/2004 | Wright et al. | 123/431 |
| 6,698,404 B2 * | 3/2004 | Palkowitsh | 123/527 |

FOREIGN PATENT DOCUMENTS

| | | |
|---|---|---|
| DE | 4200710 | 6/1993 |
| DE | 19816339 A1 | 10/1999 |
| DE | 10393644 T5 | 12/2005 |
| EP | 1118767 A2 * | 7/2001 |
| JP | 01313662 | 12/1989 |

* cited by examiner

*Primary Examiner*—Stephen K. Cronin
*Assistant Examiner*—Jason Benton

(57) ABSTRACT

A CNG fuel injector for a fuel system of an internal combustion engine. The fuel system includes a fuel rail and an engine manifold. The fuel injector includes a fuel inlet for fluid communication with the fuel rail, a fuel outlet having an orifice disposed along a longitudinal axis for fluid communication with the engine manifold, and a member proximate the fuel outlet downstream of the orifice for dispersing the CNG in a direction skewed from the longitudinal axis as the CNG flows from the orifice into the engine manifold.

12 Claims, 5 Drawing Sheets

DISPERSION-TYPE SUPPRESSOR FOR ACOUSTIC NOISE REDUCTION OF A GASEOUS FUEL INJECTOR

CROSS REFERENCE TO CO-PENDING APPLICATIONS

This application claims the benefit of the earlier filing date of U.S. Provisional Application Ser. No. 60/550,152, filed Mar. 4, 2004, which is incorporated by reference herein in its entirety.

FIELD OF THE INVENTION

This invention relates generally to noise suppression of a fuel injector for an internal combustion engine, and more particularly to noise suppression of a compressed natural gas (CNG) fuel injector.

BACKGROUND OF THE INVENTION

As consumer vehicles and commercial vehicles have evolved, it has been a desirable feature to have lower noise, vibration and harshness (NVH) for improved driver and passenger comfort. In the course of vehicle evolution, various components have been designed for function, safety and minimal NVH. As part of this effort, the overall background noise of the vehicle chassis and powertrain components have been reduced to a point such that the fuel injectors have become an objectionable noise source. This objectionable noise is exaggerated in CNG injectors. A known way to reduce the NVH of CNG injectors is to provide an acoustic barrier that covers the CNG injectors and/or the manifold in which the injectors are mounted.

It is believed that there is a need for a method and apparatus for reducing the NVH of CNG injectors without providing an acoustic barrier that covers the CNG injectors and/or the manifold.

SUMMARY OF THE INVENTION

A preferred embodiment provides a CNG fuel injector for a fuel system of an internal combustion engine. The fuel system includes a fuel rail and an engine manifold. The fuel injector includes a fuel inlet for fluid communication with the fuel rail, a fuel outlet having an orifice disposed along a longitudinal axis for fluid communication with the engine manifold, and a member proximate the fuel outlet downstream of the orifice for dispersing the CNG in a direction skewed from the longitudinal axis as the CNG flows from the orifice into the engine manifold.

Another preferred embodiment provides a CNG fuel injector for a fuel system of an internal combustion engine. The fuel system includes a fuel rail and an engine manifold. The fuel injector includes a fuel inlet for fluid communication with the fuel rail, a fuel outlet having an orifice disposed along a longitudinal axis for fluid communication with the engine manifold, and a member proximate the fuel outlet downstream of the orifice for dispersing the CNG in a direction skewed from the longitudinal axis as the CNG flows from the orifice into the engine manifold. The member may be formed of 316L stainless steel. The member may include a cylindrical side wall having a first end, and a second end. The first end may be open and confront the orifice, the second end may be closed. The cylindrical side wall and the second end may define a chamber into which CNG can be injected. The cylindrical side wall may have a length of approximately 25 mm, a diameter of approximately 12.5 mm, and a thickness of approximately 2.5 mm.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
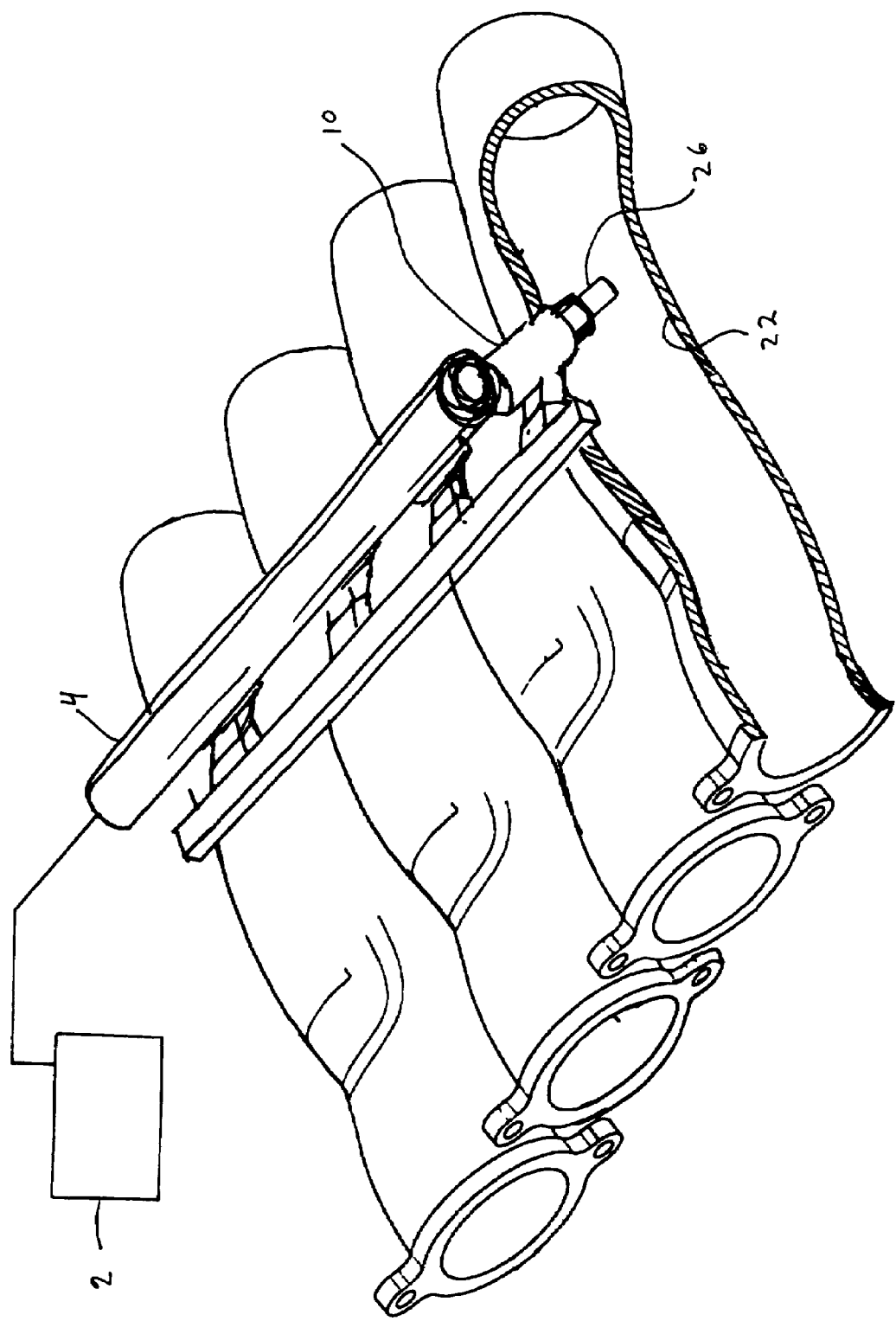
FIG. 1 is CNG fuel system for an internal combustion engine, according to an embodiment of the invention.

FIG. 1 illustrates a preferred embodiment of a CNG fuel system for an internal combustion engine. In the preferred embodiment, CNG is flowed from a CNG tank 2, through a fuel rail 4, to a CNG fuel injector 10. When the fuel injector 10 is actuated, CNG is released from the fuel injector outlet though a noise suppression device 26, and into the manifold 22.

Figure 2A:
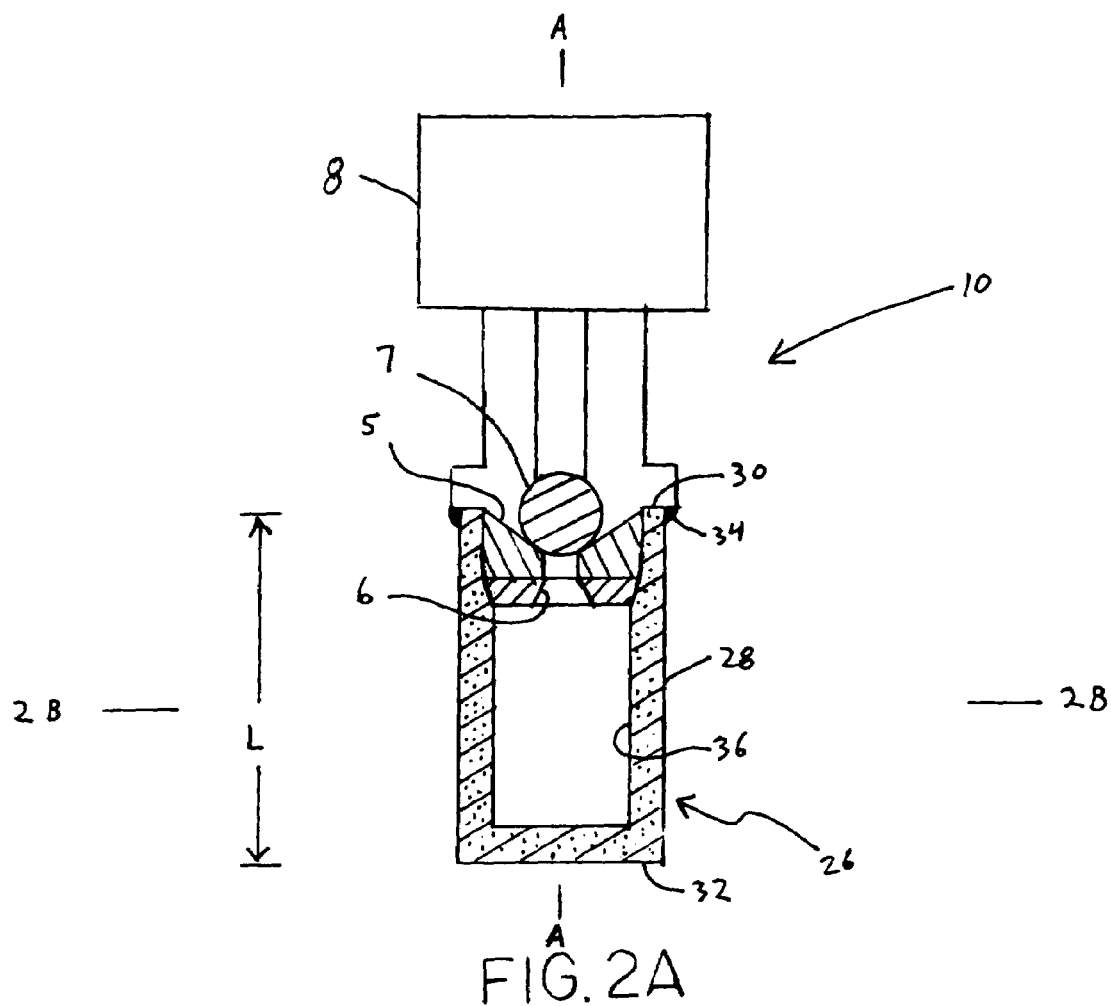
FIG. 2A is a cross-sectional view of a CNG fuel injector including a device that suppresses noise, according to an embodiment of the invention.
Figure 2B:
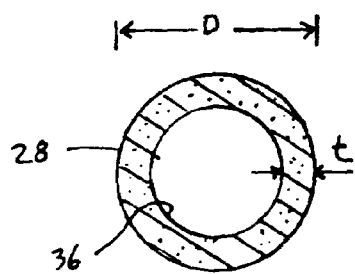
FIG. 2B is a cross-sectional view of the device for suppressing noise of FIG. 2A, at axis 2B-2B.

FIG. 2A illustrates a CNG fuel injector 10, according to an embodiment of the invention. Fuel injector 10 includes a seat 5, an orifice 6, a closure member 7, an actuator 8, and the noise suppression device 26. The actuator 8 moves the closure member 7 between a first configuration, such that the closure member 7 forms a fluid tight seal with the seat 5 and prevents fluid flow through the orifice 6, and a second configuration, such that the closure member 7 is spaced from seat 5 and allows fluid flow through the orifice 6. Device 26 is a member that is disposed proximate the fuel injector outlet within the engine manifold, and that suppresses the expanding volume of CNG as the CNG exits the fuel injector into the manifold. Device 26 may be a monolithic member having a cylindrical side wall 28 disposed around a longitudinal axis A-A, an open first end 30, and a closed second end 32. The open first end 30 may be fixed at the fuel injector outlet by a seal weld 34. The seal weld provides a fluid tight seal around the perimeter of the first open end. The cylindrical side wall 28, the fuel injector exit, and the closed second end 32 define a chamber 36 into which CNG may be dispersed. The monolithic member is formed of a sintered metal so that the cylindrical sidewall and closed second end are porous and allow CNG to pass therethrough into the manifold. As shown in FIGS. 2A and 2B, suppressor 26 is formed from sintered 316L stainless steel having a 40 μm pore size, a cylindrical wall length L of 25 mm, an outer diameter D of 12.5 mm and a wall thickness t of 2.5 mm. As CNG exits the orifice 6, the CNG enters the chamber 36 and is suppressed from flowing in the direction of longitudinal axis A-A. The CNG fills the chamber 36, permeates the cylindrical side wall 28 and the closed second end 32, and is dispersed radially outward in a direction skewed to, e.g. transverse to or oblique to, axis A-A, as well as in a direction along axis A-A.

The device 26 is not required to be a monolithic member, cylindrical in shape, fixed at the fuel injector exit, or formed of sintered metal, so long as device 26 suppresses the expanding volume of CNG as the CNG exits the fuel injector into the manifold. For example, device 26 could be a member that is not fixed to the fuel injector but is fixed to the manifold. Device 26 could be formed of a wire mesh, a sheet metal with slots formed therein, or a porous solid member that suppresses the CNG. In the embodiment where device 26 is formed of sintered metal, pore size and device dimensions may be altered.

Figure 3:
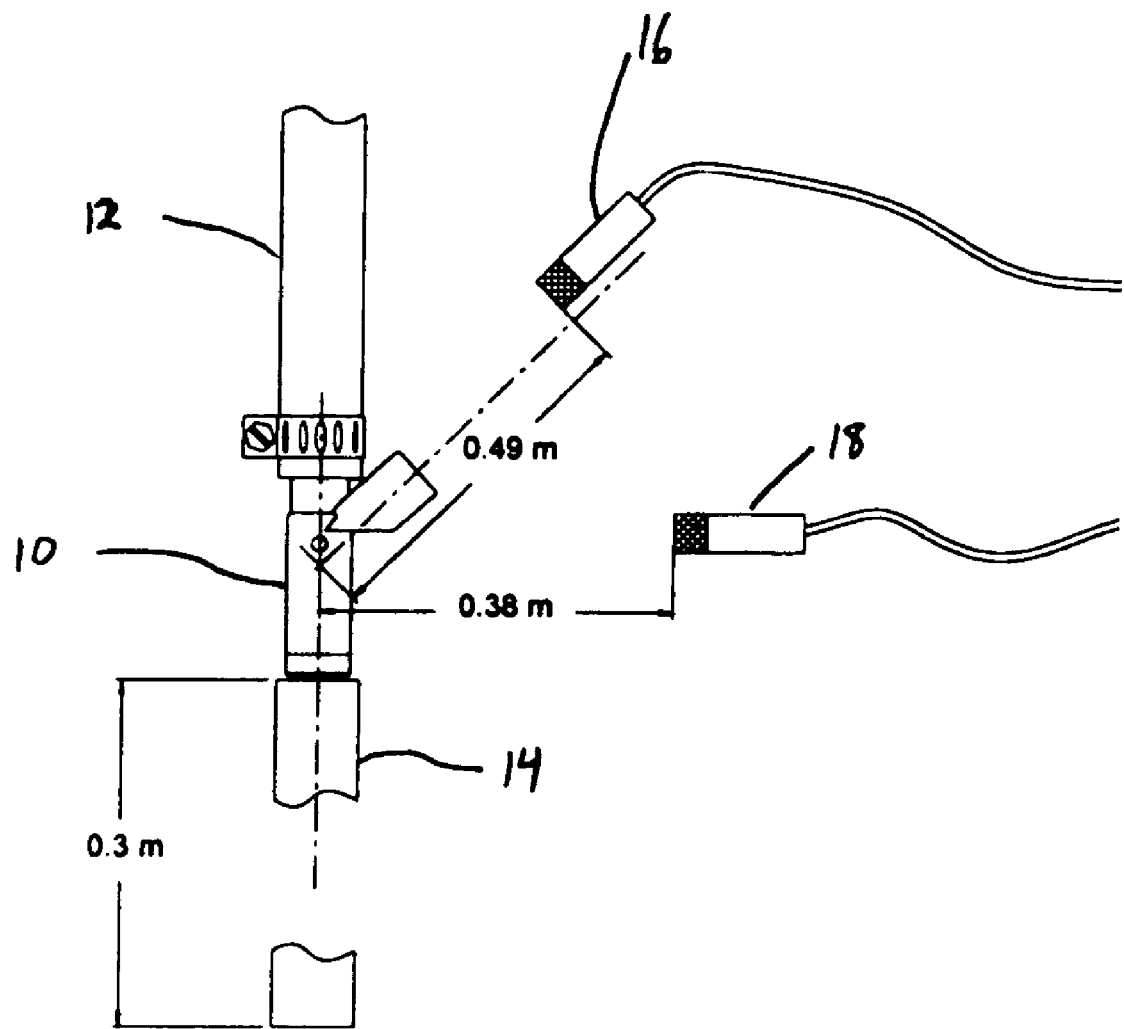
FIG. 3 is an apparatus for testing noise in a CNG fuel injector.

Applicant has conducted testing to show the effects of Applicant's invention. FIG. 3 illustrates an apparatus for testing the acoustic pressure, or noise level, of CNG fuel injectors generally of the type disclosed in commonly assigned U.S. Pat. No. 5,494,224 and U.S. Pat. No. 6,508,418, each being incorporated by reference herein in the entirety. In the preferred embodiment, testing is carried out in accordance with SAE 1832J, which is also incorporated by reference herein in the entirety. A fuel inlet of a CNG fuel injector 10 is connected to a CNG fuel supply 12, and a fuel outlet of the CNG fuel injector 10 is disposed in a baffle 14 to reduce noise transmission from exiting gas. First and second microphones 16, 18 are disposed proximate the injector connector and body, respectively, as shown in FIG. 3. Measurement is carried out with the fuel injector and microphones disposed in an anechoic chamber.

Testing of one standard flow and two high flow CNG fuel injectors was performed. The standard flow CNG fuel injector, identified as calibration 30020, has a nominal flow rate of 2.75 g/sec at 9.29 Bar abs. One high flow CNG fuel injector, identified as calibration 30019 has a nominal flow rate of 4.0 g/sec at 9.29 Bar abs. Another high flow CNG fuel injector, identified as calibration 30025 has a nominal flow rate of 3.9 g/sec at 9.29 Bar abs. The acoustic pressure of each CNG fuel injector was measured at pressures of 1, 5, 7, 9 and 11 Bar abs, with the measured data being tabulated in Table 1 below. Acoustic pressure units are in dB, A-weighted, over a standard reference level of 20 micro Pascal, and are the average of measurements taken from microphone 16 and microphone 18.

TABLE 1

| Pressure, Abs. Bar | Calib, No. 30019 | Calib, No. 30020 | Calib, No. 30025 |
|---|---|---|---|
| 1 | 58.0 | 55.1 | 57.4 |
| 5 | 70.4 | 66.7 | 71.6 |
| 7 | 73.9 | 69.5 | 73.3 |
| 9 | 75.5 | 71.2 | 76.1 |
| 11 | 77.0 | 72.7 | 78.0 |

The results indicate a strong correlation between fuel rail pressure and acoustic pressure of CNG fuel injectors. Fuel injector noise due to gas flow is a major contributor to the magnitude of noise over the same injector with no flow. Average injector noise at ambient rail pressure for any calibration tested is less than 60 dBA, and at 9 Bar absolute rail pressure this increases at least 10 dBA, also for any calibration tested.

Figure 4A:
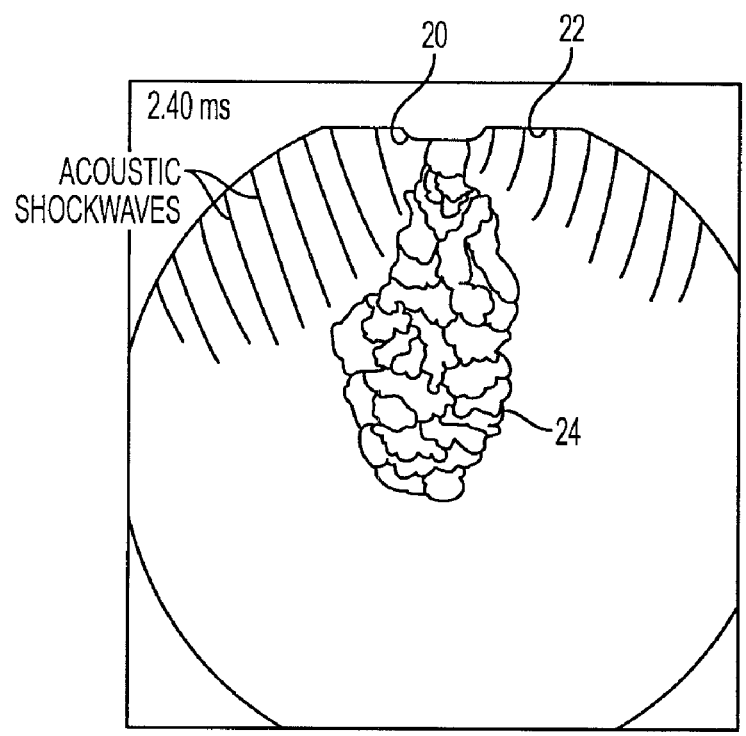
FIG. 4A shows CNG dispensed in a manifold for an internal combustion engine.
Figure 4B:
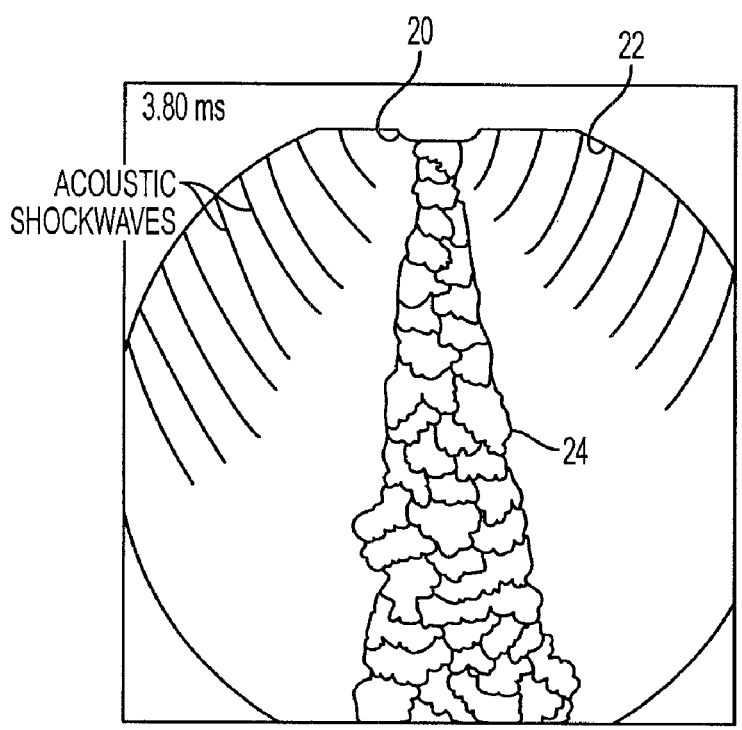
FIG. 4B shows another example of CNG dispensed in a manifold for an internal combustion engine.

The CNG fuel injectors display significantly more noise than similar mass flow liquid fuel injectors. It is believed that the increase in noise of CNG fuel injectors is due to sonic flow of an expanding gas volume of the fuel from a CNG injector, in contrast to the constant volume displacement of liquid fuel from a liquid fuel injector. The sonic flow of the expanding gas volume causes acoustic shock waves inside the engine manifold as the CNG fuel injector dispenses CNG into the manifold and the CNG impinges on the air in the manifold. FIG. 4A is a photogragh of CNG 24 dispensed from a fuel injector 20 in a manifold 22 for an internal combustion engine, taken 2.4 ms after the CNG is dispensed. The sonic flow of the expanding volume of the CNG 24 into the manifold 22 causes acoustic shock waves as shown in the figure. FIG. 4B is a photogragh of the CNG 24 dispensed from the fuel injector 20, taken 3.8 ms after the CNG is dispensed. The sonic flow of the expanding volume of the CNG 24 across the manifold 22 causes acoustic shock waves as shown in the figure.

Figure 5A:
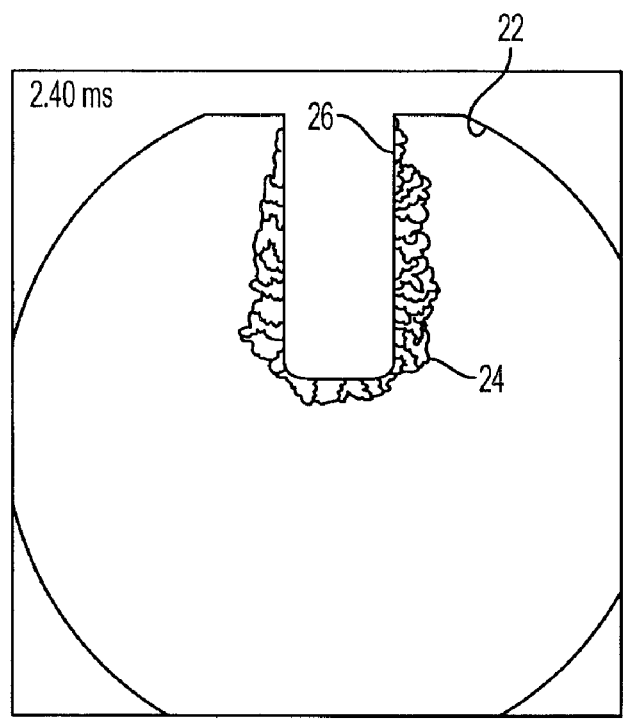
FIG. 5A shows CNG dispensed in a manifold for an internal combustion engine through the device for suppressing noise of FIG. 2A.
Figure 5B:
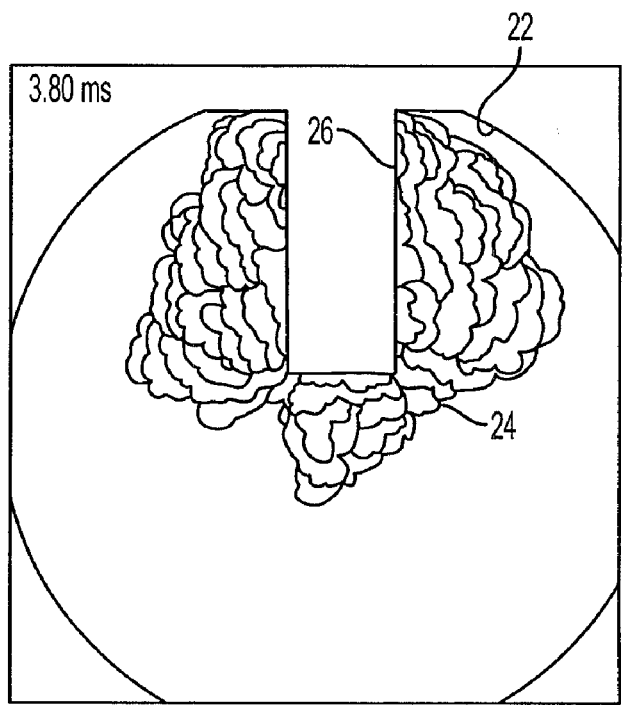
FIG. 5B shows another example of CNG dispensed in a manifold for an internal combustion engine through the device for suppressing noise of FIG. 2A.

FIG. 5A is a photogragh of CNG 24 dispensed from a fuel injector into the chamber and through the porous cylindrical sidewall and closed second end of device 26, and into a manifold 22 for an internal combustion engine, taken 2.4 ms after the CNG is dispensed. The expanding volume of the CNG 24 into the manifold 22 is suppressed and dispersed in the transverse and longitudinal direction by the porous sidewall and closed end, thus eliminating or reducing acoustic shock waves in the manifold. FIG. 5B is a photogragh of CNG 24 dispensed from a fuel injector into the chamber and through the cylindrical sidewall and closed second end of device 26, and into a manifold 22 for an internal combustion engine, taken 3.8 ms after the CNG is dispensed. Again, the expanding volume of the CNG 24 into the manifold 22 is suppressed and dispersed in the transverse and longitudinal direction, thus eliminating or reducing acoustic shock waves in the manifold.

Applicant has further confirmed the noise reduction in a high flow CNG fuel injector having two different embodiments of device 26 by measuring acoustic pressure with the testing apparatus of FIG. 3, but with the injector mounted in an engine manifold, rather than in baffle 14. Testing was performed on a high flow CNG fuel injector without a noise suppression device, with a sintered 316L stainless steel, 40 μm pore size, 25 mm long device, and with a sintered bronze, 40 μm pore size, 12 mm long device. The acoustic pressure was measured at a pressure of 9.29 Bar abs, with the measured data being tabulated in Table 2 below. Acoustic pressure units are in dB, A-weighted, over a standard reference level of 20 micro Pascal, and are the average of measurements taken from microphone 16 and microphone 18.

TABLE 2

| Device for Suppressing Noise | Average dBA |
|---|---|
| 40 μm Bronze 12 mm | 75.4 |
| 40 μm 316 L 25 mm | 73.5 |
| None | 78.2 |

The results show that the sintered 316L stainless steel, 40 μm pore size, 25 mm long noise suppression device reduces acoustic pressure by 4.7 dBA. The sintered bronze, 40 μm pore size, 12 mm long noise suppression device reduces acoustic pressure by 2.8 dBA.

While the invention has been disclosed with reference to certain preferred embodiments, numerous modifications, alterations, and changes to the described embodiments are possible without departing from the sphere and scope of the invention, as defined in the appended claims and their equivalents thereof accordingly, it is intended that the invention not be limited to the described embodiments, but that it have the full scope defined by the language of the following claims.

What is claimed is:

1. A CNG fuel injector for a fuel system of an internal combustion engine, the fuel system having a fuel rail and an engine manifold, the fuel injector comprising:
   a fuel inlet for fluid communication with the fuel rail;
   a fuel outlet having an orifice disposed along a longitudinal axis for fluid communication with the engine manifold; and
   a member proximate the fuel outlet downstream of the orifice for dispersing the CNG in a direction skewed from the longitudinal axis as the CNG flows from the orifice into the engine manifold, the member comprising a surface that defines a volume, the volume suppresses the flow of the CNG as the CNG flows from the orifice, the surface disperses the CNG in multiple directions skewed from the longitudinal axis as the CNG flows into the engine manifold,
   wherein the entire surface is porous and the CNG flows substantially through the entire surface.

2. The CNG fuel injector of claim 1, wherein the member is fixed at the fuel outlet.

3. The CNG fuel injector of claim 2, wherein the member is fixed at the fuel outlet by a weld.

4. The CNG fuel injector of claim 1, wherein the member disperses the CNG in a direction that is substantially transverse to the longitudinal axis.

5. The CNG fuel injector of claim 1, wherein the member is formed of a sintered metal.

6. The CNG fuel injector of claim 5, wherein the sintered metal includes one of sintered 316L stainless steel and sintered bronze.

7. A CNG fuel injector for a fuel system of an internal combustion engine, the fuel system having a fuel rail and an engine manifold, the fuel injector comprising:
   a fuel inlet for fluid communication with the fuel rail;
   a fuel outlet having an orifice disposed along a longitudinal axis for fluid communication with the engine manifold; and
   a member proximate the fuel outlet downstream of the orifice for dispersing the CNG in a direction skewed from the longitudinal axis as the CNG flows from the orifice into the engine manifold,
   wherein the member defines a chamber into which CNG can be injected, and
   wherein the member includes a cylindrical side wall having a first end, and a second end, the first end being open and confronting the orifice, the second end being closed, the cylindrical side wall and the second end defining the chamber.

8. The CNG fuel injector of claim 7, wherein the chamber suppresses the flow of the CNG as the CNG flows from the orifice, and the cylindrical side wall disperses the CNG in the direction skewed from the longitudinal axis as the CNG flows into the engine manifold.

9. A CNG fuel injector for a fuel system of an internal combustion engine, the fuel system having a fuel rail and an engine manifold, the fuel injector comprising:
   a fuel inlet for fluid communication with the fuel rail;
   a fuel outlet having an orifice disposed along a longitudinal axis for fluid communication with the engine manifold; and
   a member proximate the fuel outlet downstream of the orifice for dispersing the CNG in a direction skewed from the longitudinal axis as the CNG flows from the orifice into the engine manifold, the member being formed of 316L stainless steel, the member including a cylindrical side wall having a first end, and a second end, the first end being open and confronting the orifice, the second end being closed, the cylindrical side wall and the second end defining a chamber into which CNG can be injected, the cylindrical side wall having a length of approximately 25 mm, a diameter of approximately 12.5 mm, and a thickness of approximately 2.5 mm.

10. The CNG fuel injector of claim 9, wherein the member is fixed at the fuel outlet.

11. The CNG fuel injector of claim 10, wherein the member is fixed at the fuel outlet by a weld.

12. The CNG fuel injector of claim 11, wherein the chamber suppresses the flow of the CNG as the CNG flows from the orifice, and the cylindrical side wall disperses the CNG in the direction skewed from the longitudinal axis as the CNG flows into the engine manifold.

* * * * *